Jan. 1, 1963

C. V. DYE 3,071,391

TRAILER AXLE SPRING SUSPENSION

Filed Jan. 23, 1959

INVENTOR.
CLYDE V. DYE

BY *Ely, Frye & Hamilton*

ATTORNEYS

Jan. 1, 1963
C. V. DYE
3,071,391
TRAILER AXLE SPRING SUSPENSION
Filed Jan. 23, 1959
2 Sheets-Sheet 2
FIG. 3
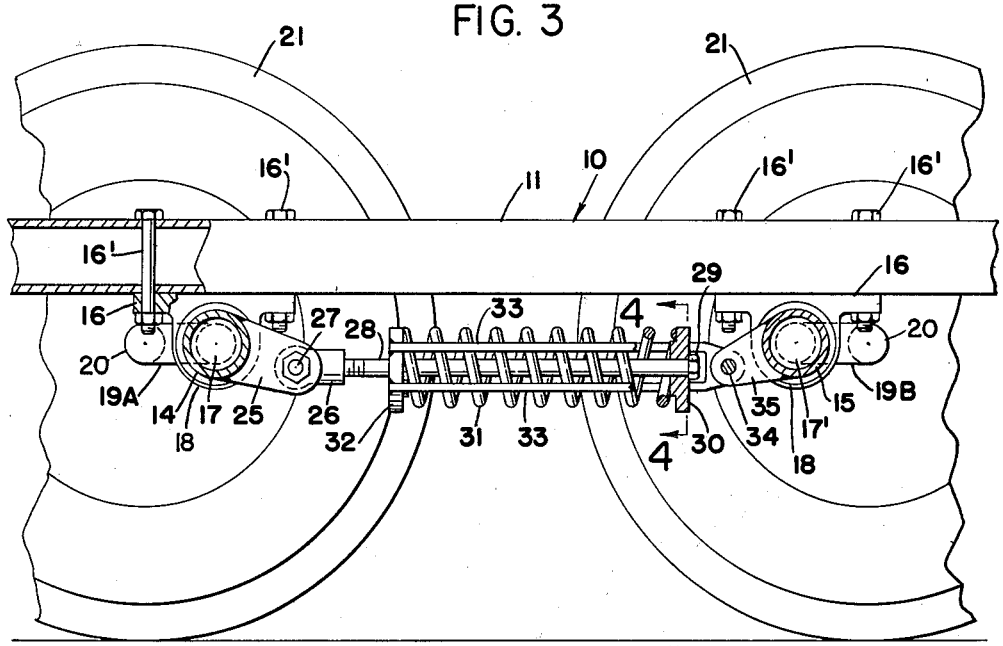
FIG. 5
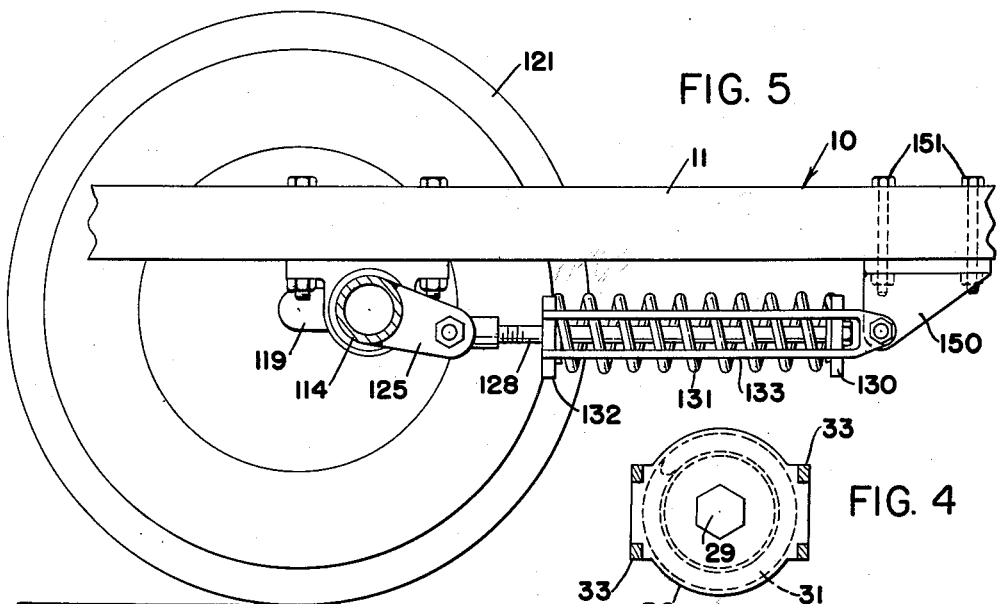
FIG. 4
INVENTOR.
CLYDE V. DYE
BY *Ely, Frye & Hamilton*
ATTORNEYS

United States Patent Office 3,071,391
Patented Jan. 1, 1963

3,071,391
TRAILER AXLE SPRING SUSPENSION
Clyde V. Dye, 436 Wildwood Ave., Akron 20, Ohio
Filed Jan. 23, 1959, Ser. No. 788,679
2 Claims. (Cl. 280—104.5)

The invention relates generally to a spring suspension for trailer vehicles, and more particularly to a spring suspension especially adapted for tandem axle trailers for transporting shifting loads such as livestock.

Certain prior constructions of this type have been unduly complicated and expensive, and have lacked stability in transporting unequal or shifting loads.

As applied to a trailer, the present construction is simple and compact and provides a stable frame with a low bed, in which the bed is level in spite of unequal loading, and the load is equally distributed to both axles.

Other objects include providing a tandem wheel suspension for a trailer, which prevents swaying or weaving of the trailer due to shifting loads, which transmits impacts on any one wheel equally to the others, and which provides firm and limited springing and damps backlash.

A further object is to provide a construction which permits operation of the trailer with one or a pair of wheels temporarily removed.

These and other objects are accomplished by the improvements comprising the present invention, preferred embodiments of which are shown by way of example in the accompanying drawings, and described in detail in the following specification. Various modifications and changes in construction are comprehended within the scope of the invention as defined in the appended claims.

Referring to the drawings:

FIG. 3 is an enlarged side elevation on line 3—3 of FIG. 2, partly broken away and in section.

FIG. 4 is a fragmentary transverse view on line 4—4 of FIG. 3.

FIG. 5 is a fragmentary side elevation of a single axle embodiment.

The frame of the trailer is indicated generally at 10 and preferably includes laterally spaced longitudinal members 11 connected at their rear ends by a transverse member 12 and connected at their front ends by converging members 13. The members 13 form a V at the front end of the vehicle to which a suitable hitch may be attached to connect the trailer to the towing vehicle. The bed of the trailer is supported directly on the frame members.

Figure 1:
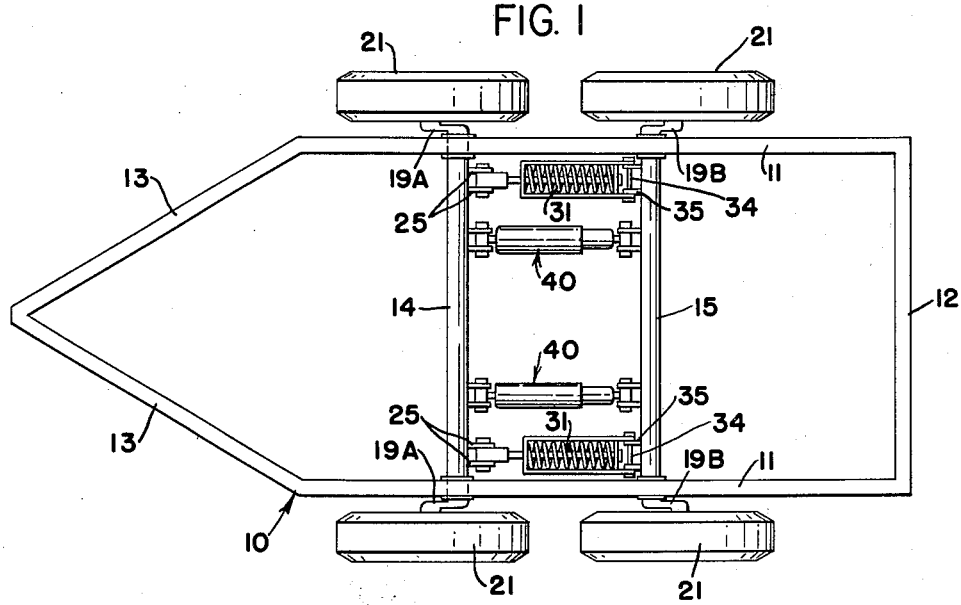
FIG. 1 is a plan view of a relatively small trailer vehicle embodying the invention.
Figure 2:
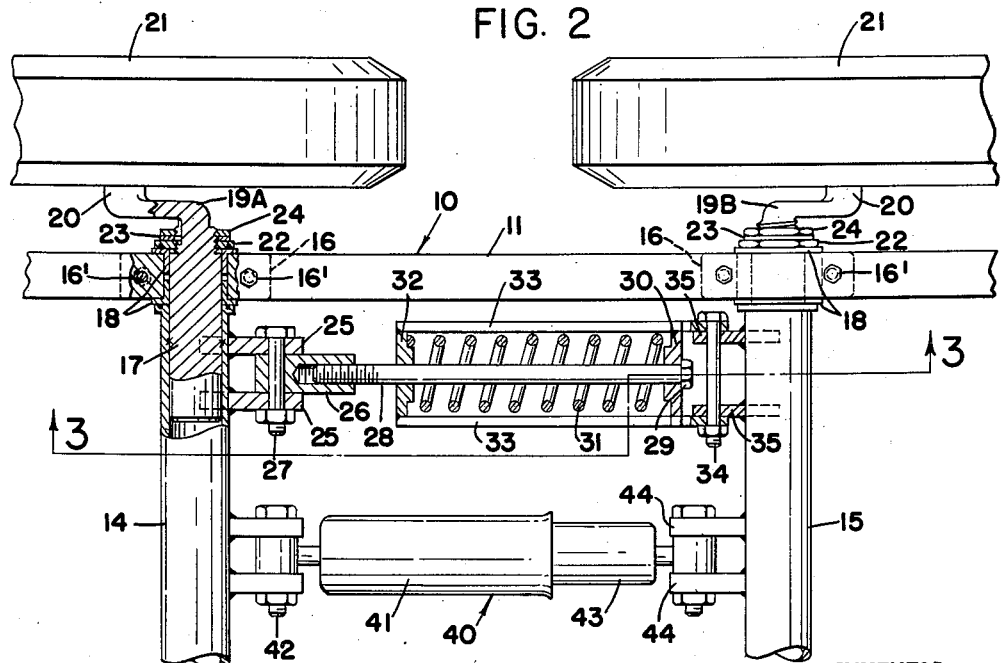
FIG. 2 is an enlarged fragmentary plan view thereof, partly in section.

The embodiment of the invention illustrated in FIGS. 1–4 has tandem axles 14 and 15 mounted in bearing brackets 16 secured on the undersides of the frame members 11 by bolts 16'. Preferably, as shown in FIG. 2, the axles 14 and 15 comprise steel tubes extending transversely between the bearing brackets.

Stub shafts 17 are non-rotatively secured within the ends of the axle tubes 14 and 15 and are journaled in flanged bushings 18 in the brackets 16. The stub shafts have outer crank arms 19A and 19B which are preferably oppositely directed (i.e., crank arm 19A on the front axle 14 extends forwardly and crank arm 19B on the rear axle 15 extends rearwardly) and terminate at their outer ends in spindles 20 on which wheels 21 equipped with conventional pneumatic tires are mounted.

Preferably, the projecting axial portions of the stub shafts 17 are threaded, and compression nuts 22 are screwed thereon in abutting relation with the outer ends of the bushings 18, the ends of the axle tubes 14 and 15 abutting the inner ends of said bushings. Lock washers 23 may be provided abutting the nuts 22, and lock nuts 24 abutting the lock washers. The bores of the washers 23 and nuts 22 and 24 are sufficiently large to pass over the spindles 20 before the wheels are mounted thereon, the wheels being journaled on the spindles in a suitable and well-known manner.

The front axle 14 has lever arms in the form of pairs of bracket ears 25 attached thereto adjacent its ends and medially of the crank arms, as by welding, and the ears extend rearwardly and downwardly toward shaft 15. A coupling pin 26 is pivoted between each pair of ears by bolt 27, and a connecting rod 28 is screwed in each pin 26 and extends rearwardly therefrom. The rear end of each rod 28 has a head 29, the front face of which abuts a plate 30 engaging the rear end of a compression spring 31 encircling the rod.

The other end of each spring 31 abuts a plate 32 secured to the front ends of bars 33 forming a framework around the spring, and the plate 30 is slidable longitudinally of the bars. The rear ends of the bars 33 are merged and pivotally connected by bolts 34 to pairs of bracket ears 35 secured as by welding to the rear axle 15. The ears 35 extend forwardly and downwardly from axle 15 and are centered in longitudinal alignment with the respective front bracket ears 25, so that the rods 28 extend longitudinally of the vehicle, and the pivot bolts 27 and 34 are preferably substantially horizontally aligned to position the rods 28 horizontally. The construction and mounting of the springs between the two axles provides for an extremely low trailer bed.

As viewed in FIG. 3, when the frame is subjected to a load the shafts 14 and 15 move vertically downward imparting torque to the crank arms 19A in clockwise direction, and to the crank arms 19B in a counter clockwise direction. This torque tends to cause the spindles 20 to swing upwardly about the axes of their shafts 17 as centers, and when the vehicle is in motion, the upward swing of the spindles results in a slight movement of the wheels 21 toward each other.

Clockwise rotation of the crank arms 19A due to vertically downward movement of the front axle 14 or to upward movement of the front wheels, causes axial rotation of the front stub shafts 17 and clockwise rotation of the lever arms 25, exerting a forward pull on the plates 30 and compressing the springs 31. Counterclockwise rotation of the crank arms 19B due to vertically downward movement of the rear axle or upward movement of the rear wheels, causes axial rotation of the rear stub shafts 17 and counterclockwise rotation of the lever arms 35, exerting a rearward pull on the plates 32 and compressing the springs.

Accordingly, when any individual wheel, or the front or rear wheels, strikes a bump, the impact is distributed through the springs to all the wheels while being at least partially absorbed by the springs. Similarly, if the load on the trailer is unequal or shifts in transit, the unequal loading is absorbed through the springs by all the wheels. Thus, the trailer bed is maintained level and stable at all times, minimizing swaying and weaving. Moreover, the vehicle can be run in case of emergency with one wheel removed, or even with either the front or rear wheels both removed.

In operation, the connecting rods 28 are adjusted in the coupling pins 26 to pre-compress the springs 31 under the normal loads for which the trailer is designed. This insures a firm and limited springing action under all conditions, and helps to level and stabilize the entire suspension assembly, as well as to minimize backlash. The connecting rod 28 and the framework bars 33 of each spring assembly constitute telescoping or overlapping means for compressing the spring in response to movement of any wheel relative to the frame.

As a further means to absorb backlash, shock absorbers 40 may be provided between the axles 14 and 15. As best shown in FIG. 2, the shock absorbers may each comprise a front cylinder 41 pivoted at its front end by a bolt 42 to a pair of bracket ears on axle 14, and a rear cylinder 43 telescopically slidable in the cylinder 41 and pivoted at its rear end in a pair of bracket ears 44 on axle 15. Movement of the cylinders 41 and 43 toward each other is yieldingly resisted by suitable and well-known fluid or spring means within the cylinders.

Hence, when the springs 31 have been compressed, as by an impact, and are suddenly released, the backlash will be absorbed or damped by the shock absorbers 40.

The improved construction can be applied to a single axle trailer vehicle, as shown in FIG. 5. The single axle 114 has crank arms 119 on the outer ends of which a pair of wheels 121 is mounted. The axle 114 has lever arms in the form of bracket ears 125 extending therefrom, and connecting rods 128 are pivotally connected at one end to said ears and at the other end to movable plates 130 for compressing springs 131. The other end of each spring 131 abuts a plate 132 on a frame 133 pivotally connected at its other end to a bracket 150 secured to frame member 11 by bolts 151.

Accordingly, unequal loads or impacts to the individual wheels are distributed to and absorbed by both springs.

It will be apparent from the foregoing description that the present invention provides a simple and inexpensive spring suspension for trailers having the advantages of a low bed, which is maintained level and stable under varying transporting conditions. The improved construction is especially adapted for transporting unequal and shifting loads, and in the case of tandem axles enables operation with one or a pair of wheels removed. The springing action is firm and limited, and unequal or shock loads are distributed to both axles and all wheels.

What is claimed is:

1. A trailer vehicle comprising, a substantially rectangular frame having side members, front and rear axles journaled on said side members, the ends of each axle outwardly of said side members being formed as oppositely directed crank arms for mounting vehicle wheels, two sets of opposed crank arms rigidly connected to each axle inwardly of said side members, said lever arms being inclined downwardly of said side members when said crank arms are parallel to said side members, compression spring means located between each set of opposed lever arms and parallel to said side members, and means for connecting each set of lever arms to one spring means for compression thereof in response to loading of said frame.

2. A trailer vehicle as set forth in claim 1 having the crank arms on the front axle extending forwardly and the crank arms on the rear axle extending rearwardly.

References Cited in the file of this patent

UNITED STATES PATENTS

| 480,274 | O'Dell | Aug. 9, 1892 |
| 1,861,866 | Knox | June 7, 1932 |
| 1,894,776 | Liang | Jan. 17, 1933 |
| 2,872,210 | Shaffer | Feb. 3, 1959 |
| 2,885,217 | Felburn | May 5, 1959 |

FOREIGN PATENTS

| 969,106 | France | May 17, 1950 |
| 592,772 | Great Britain | Sept. 29, 1947 |

OTHER REFERENCES

Germany, printed application 1,009,938, June 6, 1957.